G. A. SMART.
POULTRY APPLIANCE.
APPLICATION FILED MAR. 6, 1917.

1,255,477.
Patented Feb. 5, 1918.

Gertrude A. Smart.
Inventor

Witnesses
Ira M. Jones.
M. E. Moore

By 
Attorney

UNITED STATES PATENT OFFICE.

GERTRUDE A. SMART, OF MADISON, NEBRASKA.

POULTRY APPLIANCE.

1,255,477. Specification of Letters Patent. Patented Feb. 5, 1918.

Application filed March 6, 1917. Serial No. 152,773.

*To all whom it may concern:*

Be it known that I, GERTRUDE A. SMART, a citizen of the United States, residing at Madison, in the county of Madison and State of Nebraska, have invented certain new and useful Improvements in Poultry Appliances, of which the following is a specification.

My invention relates to improvements in poultry appliances, the main object being the provision of a device for securing the breast of the fowl along the central slit or opening for the purpose of cooking more readily and for inserting and removing the dressing.

Another object of my invention is the provision of an appliance of the character and for the purpose stated which will prove very useful and desirable, and which will cost practically nothing to manufacture.

With these and other inherent objects in view, my invention consists of a flat plate adapted to straddle the slit in the fowl, and having barbs at each end for entering the flesh of the fowl to secure the slit in closed position.

The invention further consists of an appliance of the character stated embodying novel features of construction and adaptation of parts substantially as shown, described and claimed.

Figure 1:
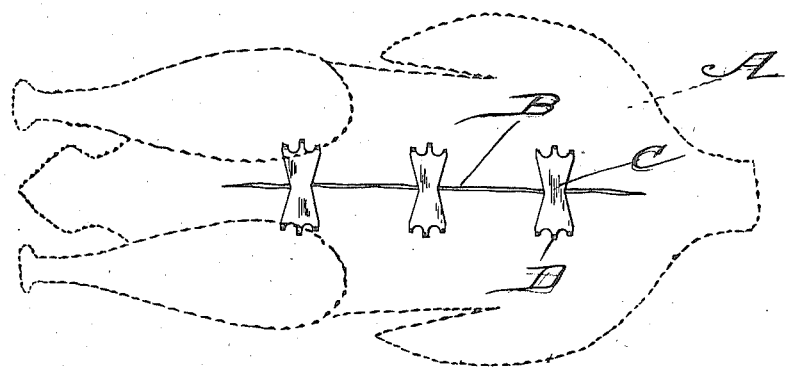
Figure 1 represents a view of a fowl with slit breast, showing my appliance in position, the fowl being shown in dotted lines, while the slit and appliances are illustrated in full lines.
Figure 2:
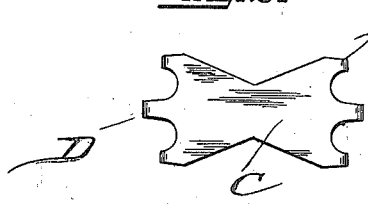
Fig. 2 represents a plan view of the appliance.
Figure 3:
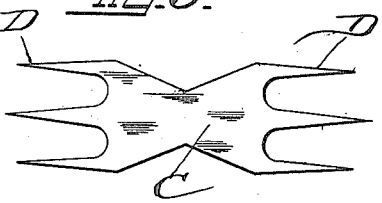
Fig. 3 represents a plan view with the prongs extended.
Figure 4:
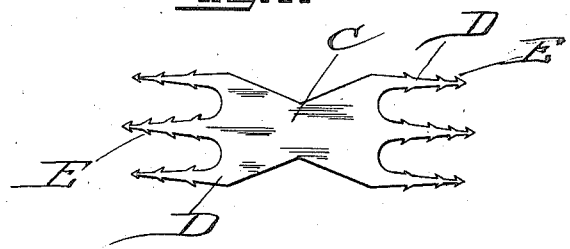
Fig. 4 represents a plan view of a slightly modified construction of my invention.
Figure 4:

The device is particularly adapted for use in closing the slit or opening in the breast of a fowl, but may be used as a marking tag, or in fact for any purpose where it could perform its function in a satisfactory manner, but in the drawings A designates the fowl having the slit B in its breast, which slit is closed by a series of my fasteners, clamps or appliances.

The said fastener or appliance is of extremely simple construction and comprises the flat plate C, which at each end is formed with pointed prongs D, adapted to be bent at an angle to the plate and forced into the flesh of the fowl, and to more readily retain these prongs in the flesh, they may be provided with a series of projecting points E, which would fasten into the flesh and prevent accidental detachment of the prongs.

It is evident that I provide a simple and cheap device which will fasten the slit of the fowl and which may be used for many purposes and prove thoroughly efficient and practical.

It will be noted that my fastener consists of a plate of novel and peculiar shape, the center of the plate being narrow or restricted and forming two flaring ends, which ends are formed each with a series of barbs located out of line, which causes the barbs to enter the meat at different places and out of line, insuring the barbs a more effective holding in the meat. To further prevent the barbs from withdrawing they may be formed each with lateral teeth, all of which features are important and constitute the gist of my invention.

I claim:

1. As a new article of manufacture, a fastener for closing the slit in fowls, consisting of a plate having a central narrow portion spanning the slit and having flaring ends formed with barbs arranged out of line to enter the fowl at different points to insure a rigid fastening.

2. As a new article of manufacture, a fastener for closing the slit in fowls, consisting of a plate having a central narrow portion spanning the slit and having flaring ends formed with barbs arranged out of line to enter the fowl at different points to insure a rigid fastening, said barbs being each formed with lateral prongs to additionally retain the barbs.

In testimony whereof I affix my signature in the presence of two witnesses.

GERTRUDE A. SMART.

Witnesses:
 JESSIE GILLAND,
 JAMES NICHOLS.